United States Patent
Chouly et al.

[11] Patent Number: 5,910,968
[45] Date of Patent: Jun. 8, 1999

[54] CONTINUOUS PHASE MODULATION DIGITAL COMMUNICATION SYSTEM

[75] Inventors: Antoine Chouly, Paris; Américo Brajal, Villeneuve-le-Roi; Josep Casals Castané, Paris, all of France

[73] Assignee: U.S. Philips Corporation, New York, N.Y.

[21] Appl. No.: 08/800,447

[22] Filed: Feb. 18, 1997

[30] Foreign Application Priority Data

Feb. 21, 1996 [FR] France .................................. 96 02148

[51] Int. Cl.$^6$ ........................... H04L 27/18; H04L 27/22; H03D 3/22
[52] U.S. Cl. ........................... 375/279; 375/283; 375/330; 375/329; 375/304; 375/345
[58] Field of Search ........................... 375/329, 330, 375/332, 331, 279, 283, 280, 348, 340, 341; 329/304, 345; 371/43.3, 43.7; 455/205, 334, 214

[56] References Cited

U.S. PATENT DOCUMENTS

| | | | |
|---|---|---|---|
| 5,440,267 | 8/1995 | Tsuda et al. | 329/308 |
| 5,581,568 | 12/1996 | Togami | 375/341 |
| 5,588,027 | 12/1996 | Lim | 375/330 |
| 5,706,313 | 1/1998 | Blasiak et al. | 375/330 |
| 5,761,243 | 6/1998 | Russell et al. | 375/233 |

OTHER PUBLICATIONS

"Reduced State Sequence Detection of Partial Response Continuous Phase Modulation", A. Swensson, IEE Proceedings–1, vol. 138, No. 4, 1991, pp. 256–268.

*Primary Examiner*—Stephen Chin
*Assistant Examiner*—Betsy L. Deppe
*Attorney, Agent, or Firm*—Gregory L. Thorne

[57] ABSTRACT

A digital communication system having a transmitter and a receiver. The receiver transmits a radio-frequency (RF) signal that is continuous phase modulated by digital data. The receiver having a converter, a differential detector, and a sequential decoder. The receiver receives the RF signal. The RF signal is converted into a baseband signal by the converter. The baseband signal is received by the differential detector wherein the continuous phase modulation of the baseband signal is detected. The detected signal is received and the digital data is decoded by the sequential decoder. The sequential decoder has a Viterbi decoder to compensate for intersymbol interference caused by the differential detector. The Viterbi decoder performs reduced Viterbi decoding utilizing a feedback loop (FB) for reducing computing inaccuracies due to the reduction of the number of trellis states.

9 Claims, 4 Drawing Sheets

CONTINUOUS PHASE MODULATION DIGITAL COMMUNICATION SYSTEM

FIELD OF THE INVENTION

The invention relates to a digital communication system comprising transmission means which are formed by modulation means for producing a radio-frequency signal, which signal is modulated by digital data according to a continuous phase modulation, and receiving means which are formed by converting means for converting the received radio-frequency signal into a baseband signal, detection means for detecting the continuous phase modulation of the baseband signal and sequential decoding means for extracting the digital data from the baseband signal.

The system may be used in satellite transmissions, notably low-rate satellite transmissions or in high-frequency transmissions, notably low-rate high-frequency transmissions.

The invention likewise relates to a receiver for detecting digitally transmitted signals via a continuous phase modulation.

BACKGROUND OF THE INVENTION

In continuous phase modulations, the information is carried by the phase. These modulations are interesting for their spectral effectiveness, their spectral power and their constant amplitude. Therefore, these modulations may be used with power amplifiers which operate near to their saturation zone.

An example of continuous phase modulation (CPM for short) is described in the document: "Reduced State Sequence Detection of Partial Response Continuous Phase Modulation", A. SWENSSON, IEE Proceedings-1, vol. 138, no. 4, 1991, pages 256 to 268. This document relates to the processing of the signals performed at the receiving end. The receiving means comprise a detector which performs a coherent detection of the baseband signal, followed by a Viterbi decoder. Such a detection does not create intersymbol interference at the receiving end. The Viterbi decoder is only provided and used for correcting the imperfections generated at the transmitting end. But such a system shows various drawbacks. First, the coherent detection needs the presence at the receiving end of a very precise oscillator, which complicates and thus increases the cost of the hardware. Moreover, the precision attained by the coherent detection is insufficient for certain applications. This is the case, for example, for low-rate transmissions (several Mbits/s, for example), for example for satellite links and for high-frequency transmissions (several GHz, for example). When the frequency/rate ratio becomes higher than, for example, $10^4$, the techniques described in above document become insufficient.

SUMMARY OF THE INVENTION

It is an object of the invention to permit the use of CPM modulations for above transmissions while a sufficient precision is obtained, and also to reduce the cost of hardware needed.

This object is achieved with a system for which the detection means perform a differential detection, the sequential decoding means being such that they correct intersymbol interference generated by the differential detection at the receiving end.

Thus, the differential detection makes it possible to have a great detection precision while the cost of hardware is reduced considerably. Still, it is necessary to devise specific sequential decoding means for compensating for the intersymbol interference caused by the differential detection at the receiving end. The sequential decoding means act on received symbol sequences. Preferably, according to the invention, the sequential decoding means comprise a Viterbi decoder which implements the Viterbi algorithm.

More particularly, the differential detection provides a differential phase which may adopt various possible transition states, the sequential decoding means comprise a Viterbi decoder which acts on a state trellis that includes a reduced number of states, and the Viterbi decoder comprises a feedback loop for reducing computing inaccuracies in the computation of metrics, which inaccuracies are due to the reduction of the number of states.

Preferably, the feedback loop causes a single binary data to occur per survivor state, which data is the result of the reduced Viterbi decoding.

The invention likewise relates to a receiver for receiving radio-frequency signals modulated by digital data according to a continuous phase modulation at the transmitting end. The receiver utilizes a converting means for converting the received radio-frequency signal into a baseband signal, a detection means for detecting the continuous phase modulation of the baseband signal, and a sequential decoding means for extracting the digital data from the baseband signal. The detection means performs a differential detection. The sequential decoding means corrects intersymbol interference caused by the differential detection at the receiving end.

These and other aspects of the invention are apparent from and will be elucidated with reference to the embodiments described hereinafter.

Figure 8:
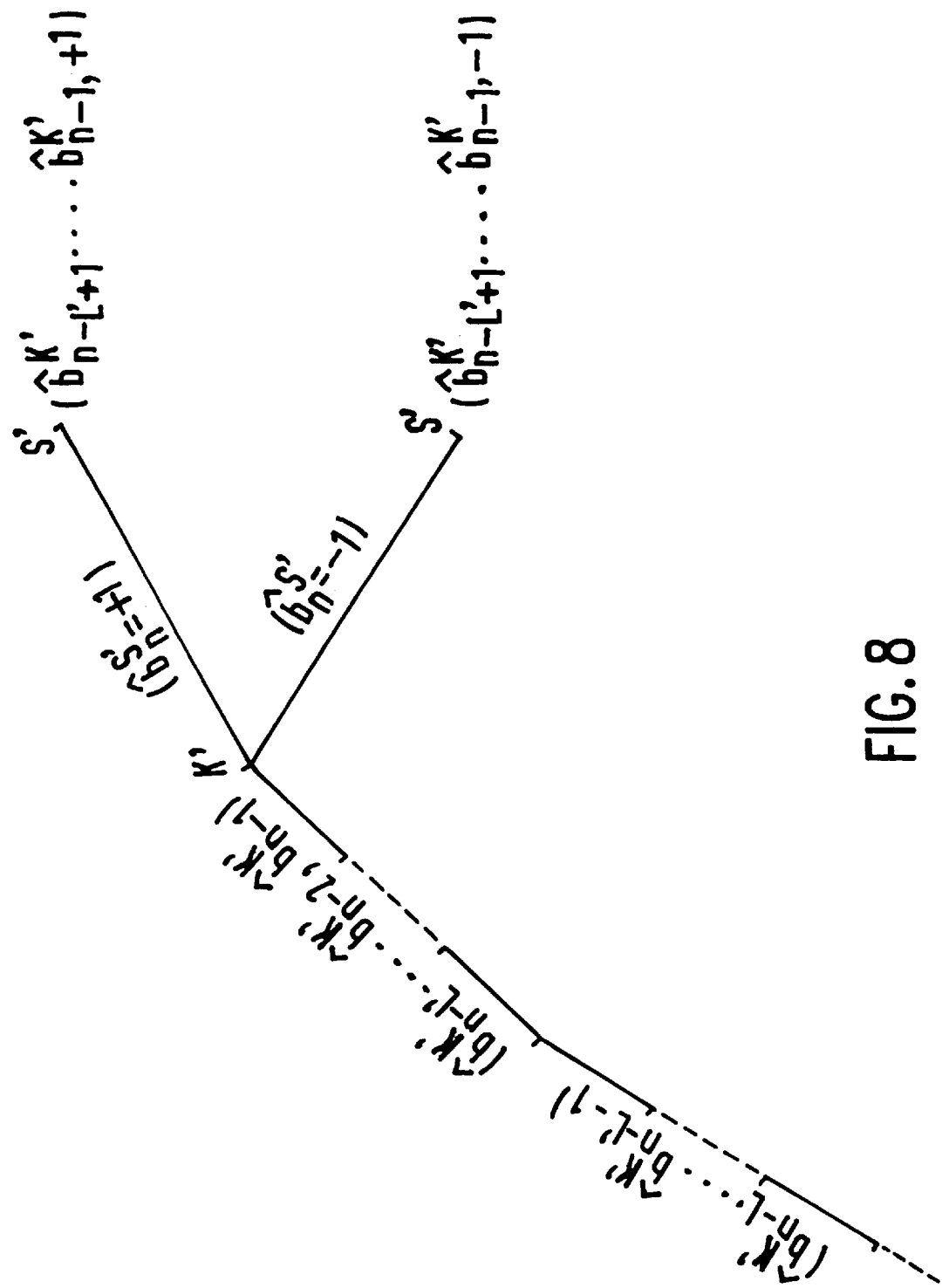

FIG. 8 gives a diagrammatic representation of the survivor states coming from the reduced trellis.

DESCRIPTION OF PREFERRED EMBODIMENTS

Figure 1:
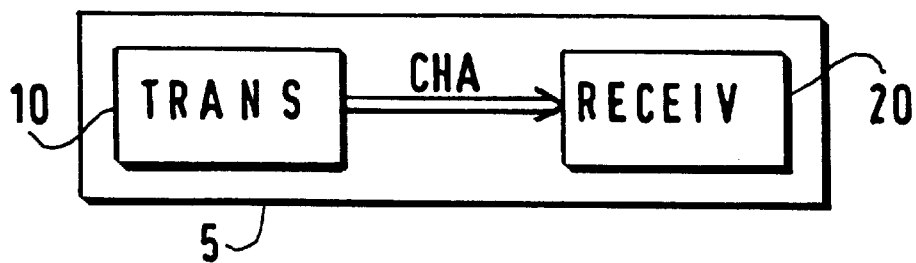
FIG. 1 shows a diagram of a communication system which is formed by a transmitter and a receiver.
Figure 2:
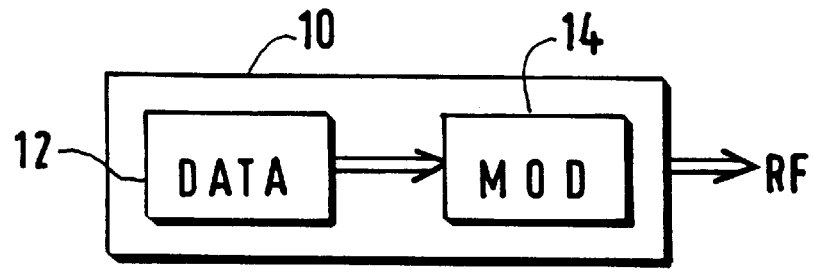
FIG. 2 shows a diagram of a transmitter.

FIG. 1 is a block diagram of a communication system 5 which is formed by transmitting means TRANS 10 and receiving means RECEIVE 20 which communicate by a communication channel CHA. The transmitter comprises a digital data source DATA 12 which is used for modulating a carrier in modulation means MOD 14 (FIG. 2) to produce a radio-frequency signal RF which is put on the channel. According to the invention, the modulation used is a continuous phase modulation CPM.

Figure 3:
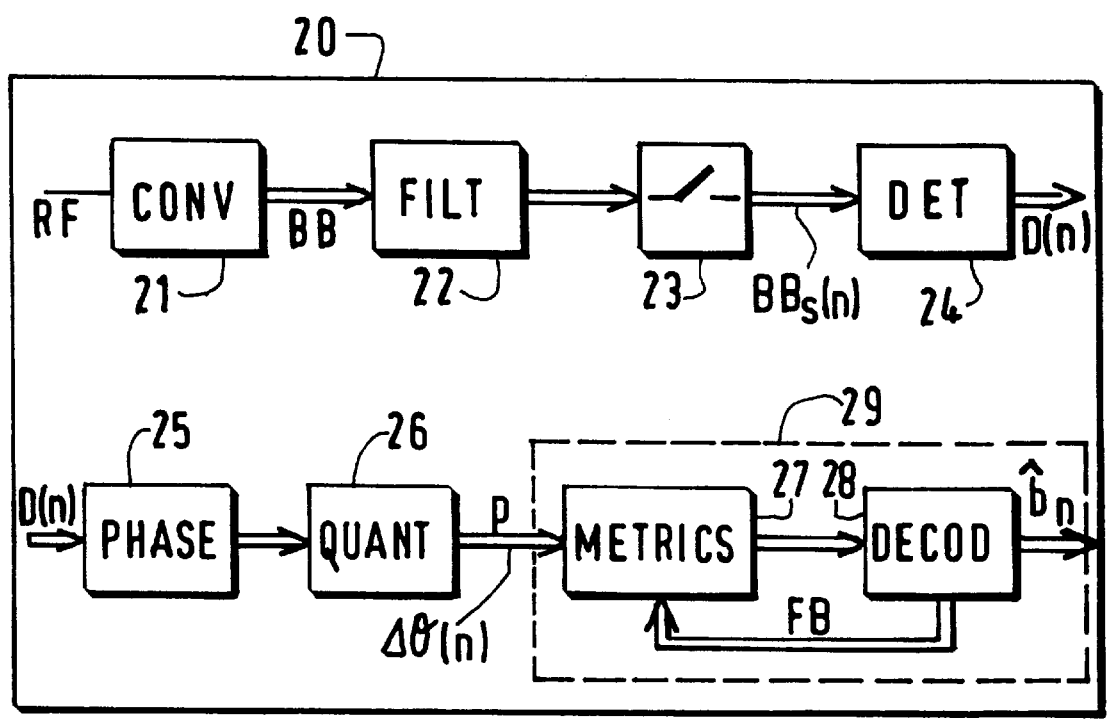
FIG. 3 shows a diagram of a receiver which includes a differential detector according to the invention.
Figure 4:
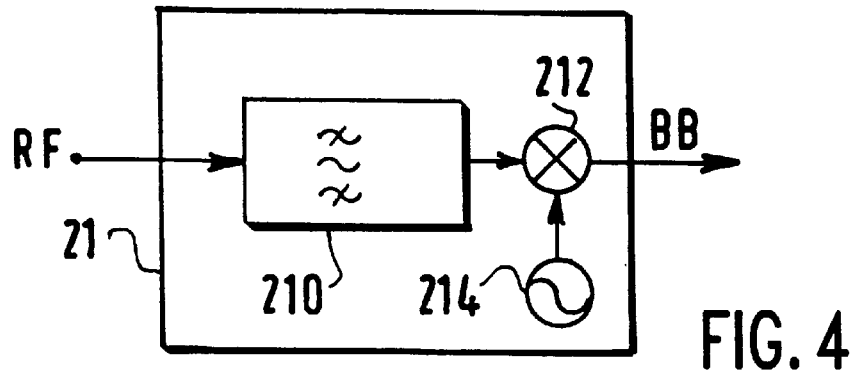
FIG. 4 shows a diagram of converting means for converting the radio-frequency signal into a baseband signal.

FIG. 3 relates to the means 20 used at the receiving end for extracting the CPM modulation digital data. The receiver 20 comprises converting means 21 for converting the received radio-frequency signal RF into a complex baseband signal BB which contains two quadrature components. FIG. 4 provides a diagram of an embodiment for converting means 21. As shown, converting means 21 utilizes a low-pass filter 210 having an output connected to a mixer 212. A local oscillator 214 applies two quadrature signals to the mixer 212, so that a complex baseband signal BB containing two quadrature components is produced at the output of the converting means.

The components of the baseband signal are filtered by a low-pass filter 22, then sampled by a sampler 23 (FIG. 3). The sampled baseband signal BB, then undergoes a differential detection in detection means 24 thereby producing a complex differential signal D(n). The differential phase of the complex differential signal D(n) is then determined in a phase meter 25.

Figure 5:
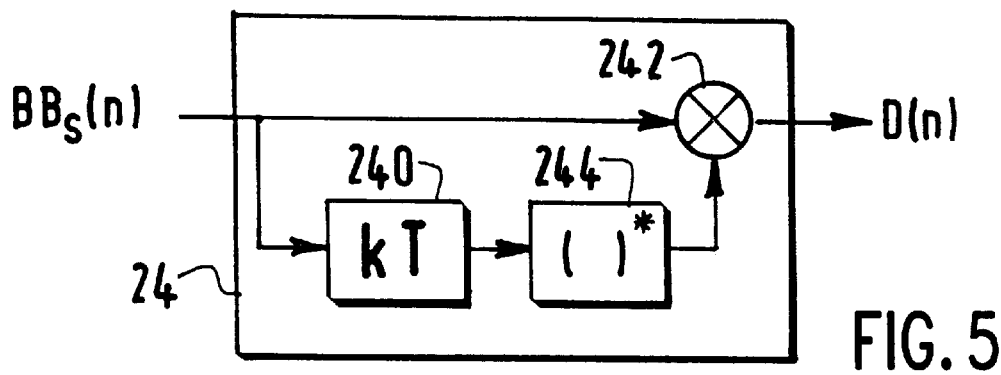
FIG. 5 shows a diagram of a differential detector for determining the phase differences.

FIG. 5 shows an embodiment for a differential detection means 24 for detecting the CPM modulation. The sampled baseband signal $BB_s(n)$ which leaves the sampler 23 at successive instants determined by n, arrives along two paths, on the one hand, in a mixer 242 and, on the other hand, in delay means 240, which delay means delay the signal k times the binary duration T. The value of the integer k has an influence on the complexity and the performance of the system assembly. More particularly, the value of k occurs in the equation of the metric to be calculated. The output of the delay means 240 is connected to transforming means 244 which transform the signal which is applied to its input into a conjugate signal. The conjugate delayed signal is multiplied by the undelayed input signal in the mixer 242, so that a complex differential signal D(n) is obtained. The latter signal enters the phase meter 25 which produces the measurement of the differential phase. This measurement which is independent of the signal phase forms a differential symbol.

The advantage of using a differential detector resides in the fact that it is not necessary to restore the phase of the carrier signal, which makes it possible to use a local oscillator that performs less well than the local oscillator necessary for carrying out a coherent detection. This leads to hardware that is much less costly.

The differential symbol is quantified in a quantifier 26 which quantifier produces $\Delta\theta(n)$ quantified in p bits. But the data leaving the quantifier cannot be used directly, because the differential detection causes intersymbol interference to occur which has to be corrected. This interference is caused by the existence of the delay path. This correction is made by applying a Viterbi algorithm via sequential decoding means 29. Therefore, the sequential decoding means comprise metric computing means 27 followed by a Viterbi decoder 28. The Viterbi decoding produces a succession of states among possible states. These possible states may be represented in the form of a state trellis. First, the system computes possible transition metrics between states, and then the system selects the paths that connect the states for which the metrics are the lowest. Indeed, it is necessary to compute the metrics of the branches that separate the states, so as to determine the optimum path for covering the trellis. The computation of the metrics is carried out in the metric computing means 27. These metrics are then processed by the Viterbi decoder 28, so that an estimate $\hat{b}_n$ is produced of the digital data $b_n$ coming from the transmitting end.

The metrics are computed by taking theoretical phase differences into account which would be obtained with a differential detector which functions without noise and phase differences which really exist in the system in operation.

The theoretical phase differences may be written as:

$$\Delta\Phi(n) = \sum_{i=0}^{L} C_i b_{n-i} \quad (1)$$

where $b_{n-i}$ are capable of adopting the value +1 or −1 and where Ci are weight factors. If the memory of the system extends over L bits ($b_{n-L}, \ldots, b_{n-2}, b_{n-1}, b_n$), then the Viterbi detector will have $2^L$ states, each state having the index n which is determined by the preceding bits ($b_{n-L}, \ldots, b_{n-1}$).

In the case of a conventional Viterbi algorithm which acts on all the states of the trellis, the metric is computed for each transition of the state $K \rightarrow (\hat{b}_{n-L}^K, \ldots, \hat{b}_{n-1}^K)$ towards the state $S \rightarrow (\hat{b}_{n-L+1}^K, \ldots, \hat{b}_{n-1}^K, \hat{b}_n^S)$.

This distance is given by:

$$d_{K-S} = [\Delta\phi_{K-S} \ominus \Delta\theta(n)]^2 \quad (2)$$

with:

$$\Delta\Phi_{K \rightarrow S} = \sum_{i=1}^{L} C_i \hat{b}_{n-i}^K + C_0 \hat{b}_n^S, \quad (3)$$

where $\Delta\theta(n)$ is the phase difference measured on the output of the differential detector, where $\ominus$ is the modulo-$2\pi$ difference sign and where the sign ( $\wedge$ ) indicates that they are estimated bits.

The output signal D(n) of the differential detection means 24 which are represented in FIG. 5 is expressed as a function of the input signal $BB_s(n)$ via the relationship:

$$D(n) = BB_s(n).BB_s^*(n-k) \quad (4)$$

that is:

$$D(n) = A^2 e^{j[\Phi(n)-\Phi(n-k)]} = A^2 e^{j[\Delta\Phi(n)]}. \quad (5)$$

By way of example, let us consider a continuous phase frequency modulation TFM (Tame Frequency Modulation) which is a particular type of CPM modulation. In this case, when the optimum sampling instant $t_0$ is selected, the sampled differential phase is expressed by a linear function of the preceding bits.

In the case where there is a single delay cell 240, that is, k=1, there is obtained:

$$\Delta\Phi(n) = \pi/8(b_{n-2} + 2b_{n-1} + b_n). \quad (6)$$

In the case where there are two delay cells 240, that is, k=2, there is obtained:

$$\Delta\Phi(n) = \pi/8(b_{n-3} + 3b_{n-2} + 3b_{n-1} + b_n). \quad (7)$$

In a general manner, for any value of k, the phase variation is written as:

$$\Delta\Phi(n) = \pi/8 \left( b_{n-k-1} + 3b_{n-k} + 4 \sum_{l=k-1}^{l=2} b_{n-l} + 3b_{n-1} + b_n \right) \forall k \geq 3. \quad (8)$$

Figure 7:
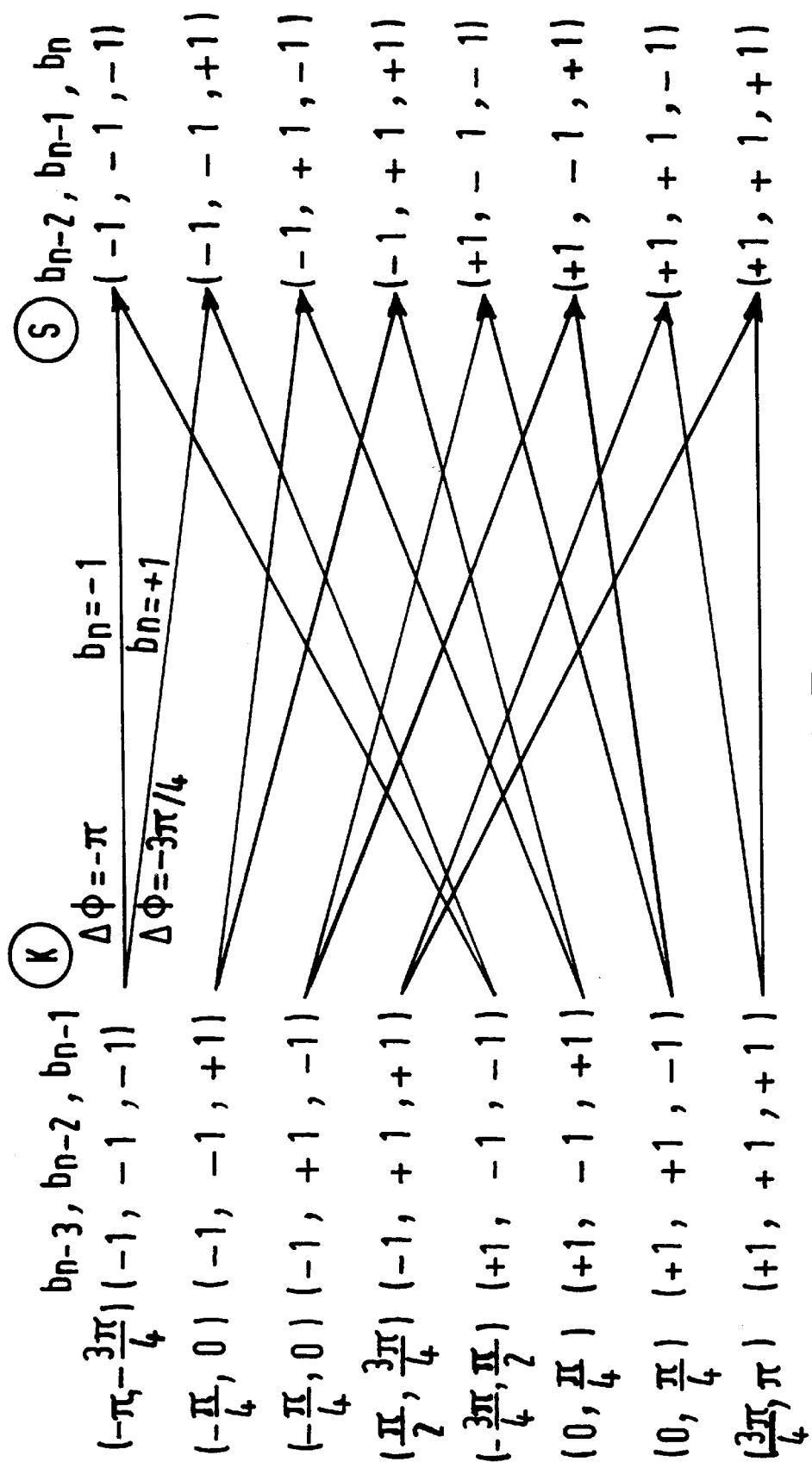
FIG. 7 shows an 8-state trellis for a differential 2-bit detection.

By way of example of a differential detection, let us consider the case of a three-bit differential detector in which the delay kT is equal to 2T. The theoretical differential phase on the output of the detector is that of equation 7. There will be noticed that the theoretical differential phase produced by the detector depends on the bit $b_n$ received at a given instant defined by n, but also on the bits $b_{n-3}$, $b_{n-2}$ and $b_{n-1}$ received before that instant. These three preceding bits define an 8-state trellis shown in FIG. 7. On the left is represented a state K determined by the bits $b_{n-3}$, $b_{n-2}$, $b_{n-1}$ and on the right is represented a state S which comes after state K. The state S is defined by the state of the bits $b_{n-2}$, $b_{n-1}$, $b_n$ which come after the three preceding bits. Thus, a state K→(−1,−1,−1) will become either the state S→(−1,−1,−1) when $b_n=-1$, or the state S→(−1,−1,+1) when $b_n=+1$. In this example, there are thus 8 possible states S and 16 metrics to be determined. To each value $b_n$ corresponds a phase difference of, for example $\Delta\Phi=-\pi$ for $b_n=-1$ and $\Delta\Phi=-3\pi/4$ for $b_n=+1$. For the other states, the phase differences $\Delta\Phi$ are indicated on the left of the diagram.

According to the invention, it is possible to apply the Viterbi decoding while taking into account all the L bits which define a state, that is to say, all the 8 states of the trellis in the case of the given example (L=3). Preferably, according to the invention, the Viterbi decoder 28 (FIG. 3) operates with a reduced number of bits L'→L, that is, L'=2 in the case of the example, the trellis then being reduced to 4 states. Moreover, to reduce the degradations caused by the reduction of the number of states, according to the invention a feedback loop FB is utilized, which takes into account bits of previous survivor states, that is to say, bits which have been put aside, leading to the reduction of the trellis.

In the case of a reduced Viterbi decoding, a transition from a state K to a state S becomes a transition from a state K' defined by $(\hat{b}_{n-L'}^{K'}, \ldots, \hat{b}_{n-1}^{K'})$ to a state S' defined by $(\hat{b}_{n-L'+1}^{K'}, \ldots, \hat{b}_{n-1}^{K'}, \hat{b}_n^{S'})$. The metric of the transition from the state K' to the state S' is written as:

$$d_{K' \to S'} = \left[\Delta\Phi_{K' \to S'} \ominus \left(\Delta\theta(n) \ominus \sum_{i=L'+1}^{L} C_i \hat{b}_{n-i}^{K'}\right)\right]^2 \quad (9)$$

with:

$$\Delta\Phi_{K' \to S'} = \sum_{i=1}^{L'} C_i \hat{b}_{n-i}^{K'} + C_0 \hat{b}_n^{S'}, \quad (10)$$

where the bits $\hat{b}_{n-i}^{K'}$, $i = \{L'+1, \ldots, L\}$ are defined by the survivor of the state K'.

In the case of the example of the TFM modulation, with a differential detector operating according to equation 7, there is observed that, compared with a coherent detection, a signal-to-noise degradation of only 0.7 dB is attained for a binary error rate of $10^{-5}$.

As regards the Viterbi decoding, for making a comparison between a Viterbi decoding which acts on the reduced number of states and a Viterbi decoding which acts on the total number of states, let us consider an example based on a 16-state trellis which is reduced to an 8-state trellis, the reduced Viterbi decoding being associated with the feedback loop FB.

Let us consider in this case, a 3-bit differential detector. The theoretical differential phase on the output of the detector is then written as:

$$\Delta\Phi(n) = \pi/8(b_{n-4} + 3b_{n-3} + 4b_{n-2} + 3b_{n-1} + b_n). \quad (11)$$

The bit $b_n$ of the state S' is thus determined by the bits $b_{n-4}$, $b_{n-3}$, $b_{n-2}$ and $b_{n-1}$. By reducing the trellis from L=4 to L'=3, the equations 9 and 10 become:

$$d_{K' \to S'} = \left[\Delta\Phi_{K' \to S'} \ominus \left(\Delta\theta(n) \ominus \frac{\pi}{8}\hat{b}_{n-4}^{K'}\right)\right]^2 \quad (12)$$

with:

$$\Delta\Phi_{K' \to S'} = \sum_{i=1}^{3} C_i \hat{b}_{n-i}^{K'} + C_0 \hat{b}_n^{S'} = \frac{\pi}{8}\left(3\hat{b}_{n-3}^{K'} + 4\hat{b}_{n-2}^{K'} + 3\hat{b}_{n-1}^{K'} + \hat{b}_n^{S'}\right), \quad (13)$$

where $\hat{b}_n^{S'}$ is the bit influenced by the transition K'→S'.

The term $$\frac{\pi}{8}\hat{b}_{n-4}^{K'}$$

features the correction made by the feedback loop.

In the case of a TFM modulation, a receiver which includes the combination of such a three-bit differential phase detector, together with a reduced Viterbi decoding which includes a feedback loop, practically has the same performance as a coherent detector with a conventional Viterbi decoding. This is all the clearer as the signal-to-noise ratio is higher.

Figure 6:
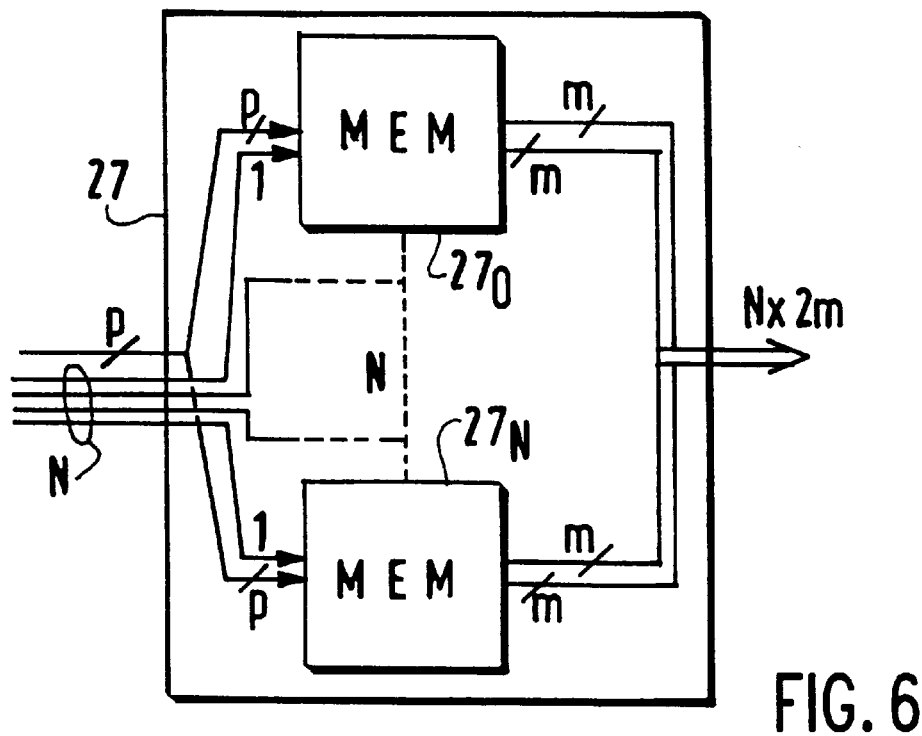
FIG. 6 shows a diagram of an embodiment for metrics computing means.

The metrics which are defined by the equations 2, 9 or 12 can be calculated in real time, but, preferably, they are precalculated and the results are stored in the form of look-up tables in memories. FIG. 6 shows an embodiment for metrics computing means 27. Preferably, means $27_0$ to $27_N$ are utilized for storing precomputed metrics. The means $27_0$ to $27_N$ are a bank of N memories MEM (for N states), for example, PROM memories which are addressed by the p bits coming from the quantifier QUANT 26 and the bits coming from the feedback loop. Preferably, the feedback loop addresses each memory by a single bit, the bit $\hat{b}_{n-4}$ for the example of equation 12. The feedback loop contains N bits (one per state), which are assigned respectively to each memory. A memory is thus addressed by p+1 bits. Each metric is stored in m bits which calls for memories that each have a capacity of $2^{p+1}.2m$ bits for producing two metrics per state. The metrics are processed by the Viterbi decoder 28 in a conventional manner. The memory remains small, for example, the size of the memory is 128×12=1536 bits for data quantified over p=6 bits and metrics coded in 6 bits.

One state is assigned to one memory. The bit $\hat{b}_{n-4}$ which addresses this memory in the feedback mode thus depends on this state and, more particularly, on the survivor state that has temporarily been retained. FIG. 8 gives a diagrammatic representation of the survivor states. At a given instant, the Viterbi decoder decides on the transition from the state K' to the state S'. If a reduced trellis comprises L' states, the fourth-order survivor contains the bit $\hat{b}_{n-4}$ which is an estimate of the transmitted bit $b_{n-4}$ which occurs in equation 11. If the Viterbi decoder acts on L' bits by abandoning, for example, one bit (L−L'=1), the feedback loop will utilize the bit $\hat{b}_{n-4}$ that has temporarily been put aside which is situated in a previous survivor. For each state, there is in this manner a survivor which contains a bit $\hat{b}_{n-4}$ that has been put aside. All the bits $\hat{b}_{n-4}$ of the survivors of the states are thus used for individually addressing one of the N memories $27_0$ to $27_N$.

It is noticed that the performance attained with the reduced Viterbi decoding (8 states), which is formed by a feedback loop, is nearly identical with that attained with a conventional Viterbi decoding without a reduction of the number of states (16 states), but much better than a Viterbi decoding not reduced to 8 states. The reduction of hardware, on the other hand, is very considerable.

The receiver, according to the patent invention, utilizing differential detection and reduced Viterbi decoding with a feedback loop, performs better, for certain conditions of use, than a receiver having a coherent detection. However, the complexity of the receiver is simplified considerably and may utilize a less precise oscillator than a coherent detection receiver. For example, the oscillator may have less quality and be capable of reaching up to 40 dB additional phase noise, without interfering with the operation of the system.

We claim:

1. A digital communication system (5) comprising transmission means (10) which are formed by modulation means (14) for producing a radio-frequency signal (RF), said radio frequency signal is modulated by digital data (12) according to a continuous phase modulation, and receiving means (20) which are formed by converting means (21) for converting the received radio-frequency signal (RF) into a baseband signal (BB), detection means (24) for detecting the continuous phase modulation of the baseband signal and sequential decoding means (29) for extracting the digital data from the detected signal, characterized in that the detection means perform a differential detection, and the sequential decoding means being such that they correct intersymbol interference generated by the differential detection at the receiving end.

2. A system as claimed in claim 1, characterized in that the differential detection provides a differential phase which may adopt various possible transition states, the sequential decoding means (29) comprise a Viterbi decoder (28) which acts on a state trellis that includes a reduced number of states, and the Viterbi decoder comprising a feedback loop (FB) for reducing computing inaccuracies in the computation of metrics (27) which inaccuracies are due to the reduction of the number of states.

3. A system as claimed in claim 2, characterized in that, for calculating the metrics, the Viterbi decoder saves survivor states from which the feedback loop extracts digital data whereby the survivor states have been put aside, thereby leading to a reduction of the state trellis.

4. A receiver for receiving radio frequency (RF) signals modulated at the transmitting end by digital data (12) according to continuous phase modulation, the receiver (20) comprising converting means (21) for converting the received radio-frequency signal (RF) into a baseband signal (BB), detection means (24) for detecting the continuous phase modulation of the baseband signal and sequential decoding means (29) for extracting therefrom the digital data, characterized in that the detection means (24) perform a differential detection, and the sequential decoding means being such that they correct intersymbol interference caused by the differential detection at the receiving end.

5. A receiver as claimed in claim 4, characterized in that the differential detection produces a differential phase which may adopt various possible transition states, the sequential decoding means (29) comprising a Viterbi decoder (28) which acts on a state trellis that includes a reduced number of states, the Viterbi decoder comprising a feedback loop (FB) for reducing computing inaccuracies in the computation of metrics (27), which inaccuracies are due to the reduction of the number of states.

6. A receiver as claimed in claim 5, characterized in that, for calculating the metrics, the Viterbi decoder saves survivor states from which the feedback loop extracts digital data whereby the survivor states have been put aside, thereby leading to the reduction of the state trellis.

7. A receiver configured to receive radio frequency (RF) signals modulated at a transmitter by digital data according to a continuous phase modulation, said receiver comprising:

a converter configured to convert the transmitted radio-frequency signal (RF) into a baseband signal (BB);

a differential detector configured to detect the continuous phase modulation of the baseband signal (BB); and a sequential decoder configured to decode the digital data from the detected signal and correct intersymbol interference generated by said differential detector.

8. A receiver as claimed in claim 7, wherein:

said differential detector is configured to provide a differential phase that adopts a plurality of transition states;

said sequential decoder comprises a Viterbi decoder that acts on a state trellis having a reduced number of states; and said Viterbi decoder comprising a feedback loop (FB) for reducing computing inaccuracies in the computation of metrics, wherein the inaccuracies are due to the reduction of the number of states.

9. A receiver as claimed in claim 8, wherein for calculating the metrics, said Viterbi decoder saves survivor states from which said feedback loop extracts digital data putting aside the survivor states, thereby leading to a reduction of the state trellis.

\* \* \* \* \*